Patented Mar. 22, 1949

2,465,319

UNITED STATES PATENT OFFICE 2,465,319

POLYMERIC LINEAR TEREPHTHALIC ESTERS

John Rex Whinfield, Accrington, England, and James Tennant Dickson, East Lothian, Scotland, assignors, by mesne assignments, to E. I. du Pont de Nemours and Company, Wilmington, Del., a corporation of Delaware No Drawing. Application September 24, 1945, Serial No. 618,398. In Great Britain July 29, 1941

Section 1, Public Law 690, August 8, 1946
Patent expires July 29, 1961

16 Claims. (Cl. 260—75)

This invention relates to synthetic products having valuable and unusual properties and to filaments, fibres and the like produced therefrom.

This application is a continuation-in-part of our application Serial Number 476,004, filed February 13, 1943, now abandoned.

Highly polymeric esters of phthalic acid and glycols, for example, ethylene glycol, trimethylene glycol, hexamethylene glycol and decamethylene glycol, are well known, and have been used for instance in the manufacture of paints and varnishes. These esters vary in character, depending on the particular glycol employed in the esterification, but without exception, they are amorphous substances with low softening points and no definite melting points. They cannot be formed into filaments having useful strength or pliability; they are freely soluble in many organic solvents; and they are easily hydrolyzed by acids or alkalis.

Synthetic linear condensation polyesters derived from glycols and dibasic acids and capable of being drawn into pliable, strong fibres showing, by characteristic X-ray patterns, orientation along the fibre axis are also known. However, although the hitherto described linear polyesters are capable of furnishing strong, pliable, highly oriented fibres, they suffer from the defect of low melting point and considerable solubility in a variety of organic solvents, and they are of no utility in the textile field.

This invention has as an object the provision of new and useful linear, highly polymeric esters having valuable properties, including that of being capable of being formed into useful filaments, fibres and the like, and having high melting points and a low degree of solubility in organic solvents. A further object is the provision of new and useful, synthetic filaments and fibres. Other objects will appear hereinafter.

The synthetic products according to the present invention are high-melting, difficultly soluble, usually micro-crystalline, cold-drawing, linear, highly polymerized esters of terephthalic acid and glycols of the series $HO(CH_2)_nCH$, where $n$ is an integer within the range of 2 to 10.

The fibres and the like according to the invention are formed by cold-drawing from the said synthetic products, and show molecular orientation along the fibre axis by characteristic X-ray patterns.

Although synthetic products in accordance with this invention can be obtained from polymethylene glycols having from 2 to 10 methylene groups, i. e. from ethylene glycol, trimethylene glycol, tetramethylene glycol, pentamethylene glycol, hexamethylene glycol, heptamethylene glycol, octamethylene glycol, nonamethylene glycol and decamethylene glycol, it is advantageous to use glycols having from 2 to 4 methylene groups, since these give highly polymerized esters with very high melting points, and of these glycols, ethylene glycol, $HO(CH_2)_2OH$, is preferred on the grounds of cost and availability. Mixtures of the glycols may be used if desired.

The synthetic products according to the invention are therefore highly polymeric polymethylene terephthalates; they are linear in structure with recurring structural units of the general formula

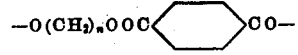

where $n$ is an integer greater than 1 but not exceeding 10.

The highly polymeric products according to the invention can be made by heating glycols of the series $HO(CH_2)_nOH$, where $n$ is an integer within the range of 2 to 10, with terephthalic acid or with esters or other terephthalic acid bodies which are capable of reacting with said glycols to form glycol esters, the reaction products being heated at temperatures above their melting points until highly polymeric esters having cold drawing properties are obtained.

The highly polymeric polymethylene terephthalates of the invention may be made by heating a mixture of terephthalic acid and a glycol of the series $HO(CH_2)_nOH$, where $n$ is an integer within the range of 2 to 10, in which at least about one molecular proportion of the glycol is present relative to the terephthalic acid. Preferably higher proportions of the glycol relative to the acid are used, for instance four or five molecular proportions of the glycol per molecular proportion of the terephthalic acid, since by using such proportions the initial esterification is caused to take place much more readily. During the heating the temperature advantageously approaches the boiling point of the glycol. Known esterifying catalysts, such as hydrogen chloride, p-toluene sulphonic acid or camphor sulphonic acid, may be added to speed up this part of the reaction, but the esterification also proceeds satisfactorily in the absence of such catalysts. Once all of the acid has reacted with the glycol, the temperature is increased, the excess of the glycol present is removed from the reaction mixture by distillation, usually under reduced pressure, and the residue is further heated above its melting point. Glycol is liberated during this process of heating, and the melting point and the viscosity of the reaction mixture gradually increase. The heating is carried on until a product having cold-drawing properties is obtained, that is to say, until filaments formed from the melt possess the property of cold drawing. The heating may be effected at atmospheric or sub-atmospheric pressures and should be in an inert atmosphere, that is, in the absence of an oxygen-containing gas. For instance, a stream of an inert gas, such as nitrogen or hydrogen, is bubbled through the molten mass, or a small quantity of an inert gas is introduced into the molten mass through a capillary. Any inert gas can be employed.

The reactions involved are firstly the esterification of the terephthalic acid with the glycol and the formation of the appropriate glycol ester of terephthalic acid, and secondly the formation from this ester of polymeric polymethylene terephthalates of increasing molecular weight up to the stage at which a product is obtained which is capable of being formed from the melt into filaments which can be cold drawn. When using a large excess of ethylene glycol, relative to the terephthalic acid, the reactions involved can be represented graphically as follows:

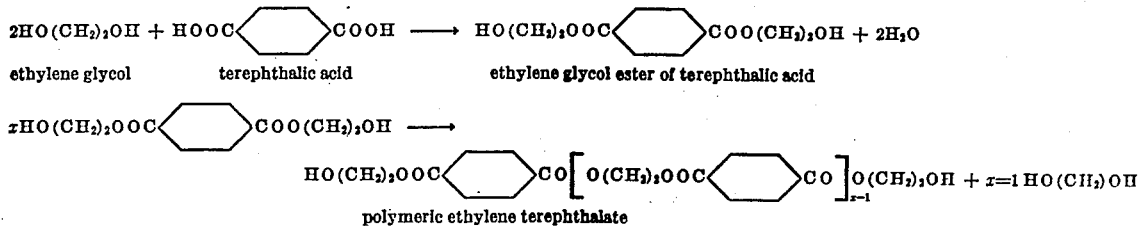

It will be apparent that the first of the above reactions involves the interaction of at least two molecular proportions of the glycol per molecular proportion of the acid. It will be noted from the above equations that glycol is liberated as the condensation proceeds. This glycol should, of course, be removed from the reaction zone.

Alternatively, the highly polymeric polymethylene terephthalates of this invention can be made by heating terephthalic acid bodies, such as ester-forming derivatives of terephthalic acid with glycols of the series $HO(CH_2)_nOH$, where $n$ is an integer within the range of 2 to 10. Suitable ester-forming derivatives are aliphatic or aromatic esters of terephthalic acid, for instance, low-molecular alkyl esters such as methyl, ethyl, propyl, butyl, amyl, hexyl and heptyl terephthalates, and aryl esters such as those from phenol, cresols and other homologues. The reaction involved is an ester interchange reaction. In practice it is preferred to use the methyl or ethyl terephthalates, since these are cheap and the most readily available. Other terephthalic acid bodies can be used which are capable of forming terephthalates under the conditions of the reaction, such as the terephthalic acid dihalides, including the dichloride, the dibromide and the diiodide, but of these the dichloride is preferred on the grounds of cost and availability.

Ester interchange reactions are reversible reactions and may be represented by the following equation:

$$ROAc + R'OH \rightleftharpoons R'OAc + ROH$$

A factor which displaces the equilibrium in the required direction is the presence of an excess of the displacing alcohol; also, in practice, the operation is effected under conditions such that the displaced alcohol can be removed by distillations, using a displacing alcohol having an appreciably higher boiling point than the alcohol to be displaced; this involves using reaction temperatures below the boiling point of the displacing alcohol, but well above that of the alcohol to be displaced.

Thus, in carrying out the ester interchange reaction for the production of the polymeric esters of this invention, at least one molecular proportion of the glycol per molecular proportion of the terephthalate should be used, greater proportions being preferred. An excess of about 50% is generally sufficient, but still greater proportions may be used if desired.

It is desirable to use an ester of terephthalic acid formed from an alcohol or phenol with a boiling point sufficiently below that of the glycol to be used so that the former can be easily removed from the reaction zone by distillation. But, as indicated previously, it is preferred to use the methyl or ethyl esters, and these esters are formed from alcohols which, because of their relatively low boiling points, are easily separated by distillation from the glycols to be used for this invention.

The heating to effect the ester interchange reaction according to this invention should be above the melting point of the reaction mixture and above the boiling point of the alcohol or phenol to be displaced, but not substantially above the boiling point of the glycol; temperatures approximating the boiling point of the glycol are advantageous. The heating should be effected under conditions such that the displaced alcohol or phenyl can be removed from the reaction zone, usually by means of conventional distillation equipment. The heating is usually at atmospheric pressures, but higher or lower pressures may be used if desired. Preferably the heating is effected in an inert atmosphere, e. g. in the presence of an inert gas, such as nitrogen or hydrogen. Heating is continued until the distillation of the displaced alcohol or phenol ceases, at which stage the ester interchange can be assumed to be completed.

When using the ester interchange method, the time required to form the gycol terephthalates may be considerably shortened, as compared with the direct method, i. e. from terephthalic acid itself and a glycol.

The reaction between the terephthalic acid dihalides and the glycols is best carried out in the presence of a diluent, for example, an inert organic solvent such as chloroform or tetrachlorethane and in the presence of a base, usually a tertiary organic base such as pyridine, N-methyl piperidine, N-dimethyl-aniline or N-diethyl-aniline. Any inert organic solvent can be used in this process.

The initial reaction involved in the production of the polymeric polymethylene terephthalates of this invention by the ester interchange method is represented graphically below:

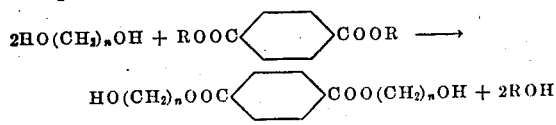

Similarly, the production of the polymeric polymethylene terephthalates of this invention from terephthalic acid dihalides involves initially the production of glycol esters of terephthalic acid, as is represented graphically below:

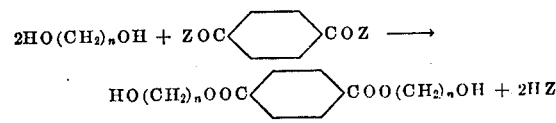

In the above equations R represents an alkyl or aryl residue, Z represents a halogen and $n$ is an integer from 2 to 10. An inspection of these equations will show that if the products of the initial reactions are to be the diesters from the glycols used, then at least two molecular proportions of the glycol per molecular proportion of terephthalic acid are required. If, as may be the case, smaller proportions of the glycols are used, then the products of the initial reaction will consist of or comprise various low molecular weight polymeric polymethylene terephthalates, and thus the products of the ester interchange reaction are the more accurately represented as mixtures of products of the formula:

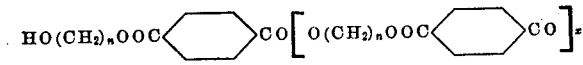

where $n$ has its former significance and $x$ is zero or a small integer.

The ester interchange reaction is advantageously carried out in the presence of ester interchange catalysts. If no catalyst is present the reaction proceeds very slowly. Ester interchange catalysts which have been tried and found to be suitable to a varying degree are lithium, sodium, potassium, calcium, beryllium, magnesium, zinc, cadmium, aluminum, chromium, molybdenum, manganese, iron, cobalt, nickel, copper, silver, mercury, tin, lead, bismuth, antimony, platinum and palladium. Some of these, such as sodium, lithium, potassium, calcium, magnesium, zinc, cadmium, manganese, iron, nickel, cobalt, tin, lead and bismuth have been found to be efficient ester interchange catalysts when used alone, but good results are also obtained when using small amounts of an alkali metal, e. g. 0.025% to 0.1%, on the weight of the initial terephthalic ester, and one or more of the metals beryllium, magnesium, zinc, cadmium, copper, silver, aluminum, chromium, molybdenum, manganese, iron, nickel, cobalt, mercury, tin, lead, bismuth, antimony, platinum and palladium. The quantities of the latter metals present can be varied widely.

The ester interchange catalysts may be added in the form of powder, chips, shavings, ribbon, wire or in any other convenient form. The alkali metals, the alkaline earth metals or magnesium are conveniently used in the form of alcoholates, formed by dissolving them in the glycol to be used or in another alcohol such as methyl or ethyl alcohol. Further, the alkali metals may be used in the form of their carbonates or other alkaline reacting salts, for example, borates. Magnesium may be used in the form of its oxide.

It has also been found that the ester interchange process is accelerated by the presence of non-metallic ester interchange catalysts, for example, boron, or by purely surface catalysts, such as broken glass or silica gel, in the presence of a small amount of an alkali metal ester interchange catalyst. As a matter of fact any of the known compatible ester interchange catalysts can be employed.

The products of the ester interchange reaction, or the low molecular weight polymeric polymethylene terephthalates otherwise obtained, can be converted into the highly polymeric products of this invention by heating them at a temperature above the boiling point of the corresponding glycol, under conditions effecting removal of the glycol. Advantageously, during the heating or during part of the heating, the pressure is reduced so as to facilitate rapid distillation of excess of glycol present. The pressure may be reduced in successive stages so that the heating begins at normal pressure, is continued at a reduced pressure and is completed at a still further reduced pressure. Pressures of from 20 down to 1 mm. of mercury are particularly suitable. Higher or lower pressures may be used if desired. The materials used as catalysts may also be present during this stage of the reaction. Metal catalysts may be used in the second part of the process when starting from terephthalic acid or a terephthalic acid dihalide to accelerate conversion of the low polymeric alkylene terephthalate into high polymers possessing cold drawing properties.

The heating should be conducted under conditions to prevent oxidation, that is, the presence of oxygen should be avoided and a slow stream of an inert gas, for example, nitrogen or hydrogen, is advantageously passed through and/or over the molten mass.

During the heating, the melting point and the viscosity of the melt gradually increase; the temperature must be maintained high enough to keep the mass in the molten state during the whole of the heating period.

The heating is continued at least until a filament formed from the melt possesses the property of cold-drawing. After the heating is completed, the product may be extruded or otherwise removed from the reaction vessel in molten form, and subsequently cooled. The extruded material may be formed into blocks, chips and the like.

The products of the invention are linear highly polymeric esters having recurring structural units of the following formula:

where $n$ is an integer within the range of 2 to 10. The three lower members of this series, namely the ethylene terephthalate, the trimethylene terephthalate and the tetramethylene terephthalate contain the following recurring structural units.

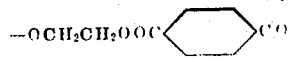

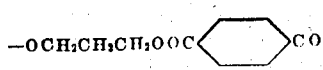

and

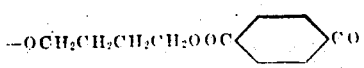

respectively.

The esters of this invention when freshly formed and in the undrawn state are sometimes amorphous in character. They become microcrystalline upon standing. They are highly-viscous, transparent to slightly opaque liquids, depending on the presence or absence of inorganic materials added as catalysts, at temperatures slightly above their melting points. If the melts are allowed to cool slowly or if the esters are heated at a temperature somewhat below their melting points, crystallization suddenly occurs and the glassy solids become porcelain-like, opaque solids. The esters have melting points ranging up to about 258° C. for the ethylene terephthalate, these melting points increasing rapidly with their degree of polymerization. The lower members of the series have melting points above 200° C. They have solubilities in organic liquids which decrease with their polymerization. They are resistant to hot and cold dilute acids and, when formed into filaments by drawing or extrusion the filaments are capable of being cold-drawn to the extent of several hundred per cent of their original length to form fibres. The fibres thus formed show by characteristic X-ray patterns molecular orientation along the fibre axis. They have great strength and pliability, are highly lustrous and are insoluble in most organic liquids.

When extruded or drawn in the molten state, the highly polymeric polymethylene terephthalates yield filaments which can subsequently be cold-drawn to the extent of several hundred per cent of their original lengths, whereby molecularly oriented structures, i. e. fibres of great strength and pliability are obtained, and it is in the form of such filaments and fibres that the highly polymeric polymethylene terephthalates of the invention find their greatest utility in the art.

The filaments can be formed by extrusion or by drawing from the melt directly after the completion of the heating during which the highly polymeric product is formed. Alternatively, blocks or chips or like shapes may be remelted and thereafter formed into filaments. Any suitable apparatus can be used.

The cold-drawing operation may be carried out on filaments which have been allowed fully to cool and solidify after their formation, or it may directly follow the formation of the filaments as one part of a continuous process. Any suitable apparatus and process may be used for cold-drawing. For instance, the filaments may be wound from one roller to another, the second roller rotating at a higher speed than the first roller, for example, at a speed up to about 4 or 5 times that of the first roller. Alternatively, the cold-drawing may be effected by employing a snubbing pin.

The term cold-drawing, as used herein, includes warming the filaments to facilitate stretching, for instance, by passing them through warm or hot water or steam before and/or during the cold-drawing operation.

In respect of their fairly definite melting points and their ability to yield fibres the highly polymeric polymethylene terephthalates resemble the corresponding polymethylene esters from aliphatic acids of the series $HOOC(CH_2)_nCOOH$, where $n$ is greater than unity, but no such behavior is shown by the corresponding esters derived from phthalic acid.

While the melting points of the aliphatic polyesters are substantially independent of the degree of polymerization, the melting points of the terephthalates increase with the degree of polymerization to a remarkable extent and reach values much in excess of those of the aliphatic polyesters. Thus, esters isolated at an early stage of the reaction between terephthalic acid and ethylene glycol have melting points in the region of 130° C., but the higher polymers do not melt below 240° C.

Again, in the case of the aliphatic polyesters, the free solubility which they display in many organic solvents is a property substantially independent of their molecular weight, but this is not true of the highly polymeric polymethylene terephthalates, the solubility of which markedly diminishes as polymerization proceeds.

These differences in properties between the products of the present invention and those similar materials hitherto described are of outstanding importance, and considerably enhance the utility and widen the field of application of the products of the present invention, particularly in the textile industry.

The invention will now be further described with reference to a number of specific examples, which are to be regarded solely as illustrative, and not as restricting the scope of the invention.

The following examples illustrate the production of the preferred product of the invention, highly polymeric ethylene terephthalate:

Example 1

50 grams of terephthalic acid and 89 grams ethylene glycol were refluxed for about 72 hours until solution was effected. The resulting glycol terephthalate was then washed with water, dried in vacuo, and further heated in a stream of nitrogen for 8½ hours at 280° C. The resulting polymer of melting point 254–255° C. was very viscous and possessed good cold-drawing properties.

Example 2

10 grams of methyl terephthalate, 4.85 grams of ethylene glycol, and 0.003 grams of sodium were heated in a distilling tube in a stream of oxygen-free nitrogen for about 3 hours at 197° C., until most of the methyl alcohol was removed and the ester interchange reaction was practically complete. The resulting low polymeric glycol terephthalate was then further heated at 280° C. under ordinary pressure for 30 minutes, and then for a further 10 hours in vacuo, a slow current of nitrogen being introduced through a capillary. The resulting product was a while polymer, melting at 256° C. to a highly viscous liquid, and possessing cold-drawing properties.

Example 3

15 grams of methyl terephthalate, 7.27 grams of ethylene glycol, 0.0075 grams of sodium, and six inches of clean magnesium ribbon (1 gram) were heated as in Example 2 at 197° C., and the ester interchange was practically completed at the end of one hour only. The low polymeric glycol terephthalate thus obtained was further heated at 280° C. as in Example 2, but the high polymer possessing the desired properties was already obtained after 2 hours.

Example 4

The process was exactly as described in Example 3, except that 0.1 gram of boron was added in place of the magnesium ribbon.

Example 5

The process was the same as in Examples 3 and 4, except that manganese chips were used as the secondary catalyst in addition to sodium.

Example 6

15 grams of methyl terephthalate, 7.27 grams of ethylene glycol, and 0.005 gram of lithium (as lithium methoxide dissolved in methyl alcohol) were heated at 197° C. as described in Example 2. The ester interchange reaction was practically completed after 45 minutes, and on subsequent heating as described in Example 2, a cold-drawing polymer was obtained after 2½ hours.

Example 7

15 grams of methyl terephthalate, 7.27 grams of ethylene glycol and a small quantity of magnesium turnings (0.1 gram) were heated at 197° C. as in the preceding examples. The ester interchange reaction was practically completed after 30 minutes only. On further heating at 280° C. a cold-drawing polymer was obtained after 4 hours.

Example 8

22.2 grams of ethyl terephthalate, 9.3 grams of ethylene glycol, 0.006 gram of lithium (as lithium ethoxide dissolved in ethyl alcohol) and 0.5 gram of magnesium ribbon were heated together at 197° C. in a distilling tube in a slow stream of oxygen-free nitrogen for 45 minutes by which time the ester interchange was complete and the ethyl alcohol liberated had been distilled off. The temperature was raised to 280° C. for 20 minutes and a vacuum then applied. The heating at 280° C. in vacuo was continued for 2½ hours by which time the melt was highly viscous and filaments drawn from the melt possessed good cold-drawing properties.

Example 9

6 grams of phenyl terephthalate, 2.4 grams of ethylene glycol and 0.005 gram of potassium carbonate were mixed together and heated in a stream of oxygen-free nitrogen at 197° C. for 1 hour under conditions whereby the phenol formed by the ester interchange reaction could distill off. Under these conditions most of the phenol was removed; the remainder was removed by further heating the mixture at 280° C. for 30 minutes. The pressure was then lowered to about 1 mm. of mercury and the heating continued at 280° C. for a further 5 hours. Highly polymeric ethylene terephthalate was obtained.

Example 10

9.15 grams of terephthalyl dichloride was added slowly to a mixture of 3.45 grams of ethylene glycol, 8.5 grams of pyridine and 75 grams of chloroform. The mixture was then gently boiled under reflux for one hour, cooled, and poured into ether. The oil which separated was removed and shaken with an excess of dilute hydrochloric acid and a white solid, a low polymeric ethylene terephthalate, with a melting point of about 130° C. was obtained. The white solid was well washed with water, dried, and heated in a stream of oxygen-free nitrogen in the presence of 1 gram of magnesium ribbon firstly at 197° C. for 15 minutes, and then at 280° C., with the pressure being gradually reduced to 1 mm. of mercury for 6 hours. Highly polymeric ethylene terephthalate was obtained.

Example 11

300 grams of terephthalic acid and 550 grams of ethylene glycol were mixed together and heated in an atmosphere of nitrogen, by means of a bath at 200–210° C. After 18 hours all of the acid had dissolved. The temperature was then raised and the excess of glycol was removed from the reaction mixture by distillation. The temperature was brought up to 287° C. and maintained for 7½ hours. After the first hour at 287° C., the pressure was reduced to about 15 mm. of mercury, and after a further 1½ hours the pressure was again reduced to 1½–2 mm. of mercury. Filaments formed from the molten mass could be extended by cold-drawing into fibres.

The product of all the preceding examples is a highly polymeric ethylene terephthalate; it has recurring structural units with the following general formula:

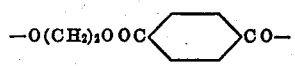

it has a melting point lying between 254° and 258° C. when measured in a capillary tube in the absence of air. It is a white, hard, porcelain like material; when molten it can be formed into filaments which can be extended by drawing to as much as five times their original lengths forming flexible and strong fibres; the latter show, by characteristic X-ray patterns, orientation along the fibre axis. The product is not dissolved by the usual organic solvents and it dissolves with difficulty and only to a slight extent in highly polar solvents such as formamide, nitrobenzene, phenol and m-cresol, at relatively high temperatures. At temperatures up to 140° C. the crystalline or micro-crystalline form is undissolved and otherwise unaffected by amyl benzoate, amyl phthalate, amyl salicylate, benzyl benzoate, benzyl butyl phthalate, dibutyl phthalate, ethyl acetate, ethyl benzoate, ethyl alcohol, benzyl alcohol, diethylene glycol, formic acid, acetic acid, amyl benzyl ether, dibenzyl ether, m-dimethoxybenzene, dioxan, dimethylformamide, pyridine, acetone, chloroform, carbon tetrachloride and benzene. It is practically unaffected by hot or cold dilute acids, and it shows a surprisingly good resistance to degradation by strong acids. For instance, it is practically unaffected by boiling for 1 hour in 10% aqueous hydrochloric acid, in 30% sulphuric acid or in glacial acetic acid. It is surprisingly stable to hot or cold alkalis.

The following examples illustrate the production of highly polymeric polymethylene terephthalates from glycols other than ethylene glycol:

Example 12

15 grams of methyl terephthalate, 8.9 grams of trimethylene glycol, 0.0013 gram of sodium, and six inches of clean magnesium ribbon (1 gram) were heated together at 197° C. in a distilling tube in a stream of oxygen-free nitrogen, for 1¼ hours, when the ester interchange reaction was practically completed. The resulting low polymeric trimethylene glycol terephthalate was then heated at 280° C. for 30 minutes at ordinary pressure and for a further 3 hours in vacuo, when a cold-drawing polymer of melting point 221° C was obtained.

Example 13

1.7 grams of terephthalic acid and 4.5 grams of tetramethylene glycol were heated together at 220–240° C. for about 3 hours until solution was effected. The resulting melt was heated for 2½ hours at 249° C. with a stream of nitrogen passing through the molten mass, and then for a further 12 hours at 249° C. under vacuum. The resulting highly polymeric tetramethylene terephthalate cooled to a crystalline, porcelain-like polymer of melting point 208° C. which could be melt-spun to give filaments possessing good cold-drawing properties.

*Example 14*

4.8 grams of methyl terephthalate, 4.45 grams of hexamethylene glycol, 0.0015 gram of lithium dissolved in 0.5 gram of methyl alcohol and 0.5 gram of magnesium ribbon were mixed together and heated for 1½ hours at 197° C. in a stream of oxygen-free nitrogen under conditions whereby the methyl alcohol was removed. The so obtained low polymeric hexamethylene glycol terephthalate was then heated at 245° C., in vacuo, for 2 hours, when a cold-drawing polymer, highly polymeric hexamethylene terephthalate, melting at 136° C. was obtained.

*Example 15*

2.4 grams of methyl terephthalate, 3.2 grams of decamethylene glycol, 0.0024 gram of sodium and 4 inches of clean magnesium ribbon (0.7 gram) were heated together at 197° C. for 1½ hours, and at 280° C. in vacuo for 3 hours, under the conditions described in the preceding examples. The result was a white, cold-drawing polymer of melting point 123° C., highly polymeric decamethylene terephthalate, which was softer at room temperature than the one obtained from ethylene glycol.

The following examples are illustrative of the production of filaments and fibres from the hereinbefore described highly polymeric esters of this invention.

*Example 16*

A quantity of highly polymeric ethylene terephthalate was heated in the absence of oxygen to a temperature of 280° C. and extruded through a single hole spinneret. The so obtained filament had a moisture regain of 0.7% at 21° C. and 65% RH, and the maximum absorption of water at 21° C. was only 4.4% by weight.

The filament was cold drawn at a draw ratio of 4.7/1 to give a strong, flexible fibre of diameter 0.075 mm. On testing in the Cliff autographic recorder (Journal of the Textile Institute, (1933), 24, T 351) at 16° C. and 65% RH the fibre showed a breaking load of 180.5 grams corresponding to a tensile strength of 40.75 kg./mm.² The extension at break was 10% on the original length.

*Example 17*

A quantity of highly polymeric ethylene terephthalate was spun at a temperature of 286° C. and the filament obtained was drawn at a ratio of 4.43/1 giving a strong, flexible fibre with a diameter of 0.11 mm. When tested in the Goodbrand single thread tester at 22° C. and 65% RH, the breaking load was 348 grams which corresponded to a tensile strength at break of 36 kg./mm.² The extension at break was 18.5% of the original length. The same fibre, when thoroughly wet with water, showed a tensile strength at break of 30 kg./mm.²

The other highly polymeric polymethylene terephthalates of this invention can be formed into filaments and fibres in a similar manner.

When examined under X-rays, the undrawn filaments showed patterns which indicated that they were entirely amorphous and that there was no orientation of the molecules. After heating at 100° C. in water for 2½ hours, the filaments still showed X-ray patterns giving no appearance of orientation of the molecules, but they showed a distinct appearance of crystallinity. The substantially fully drawn filaments, i. e. the fibres, showed characteristic X-ray patterns for molecular orientation along the fibre axis.

*Example 18*

A quantity of highly polymerized highly polymeric ethylene terephthalate was cast in the form of a rod and melt extruded in a rod spinning apparatus of the kind described in British Patent No. 527,532 using a plate spinneret having 5 holes each of 0.254 mm. diameter. The temperature in the melt chamber was 280° C. and the rod passed into the apparatus at the rate of 1 cm. in 2½ mins. The spun filaments were wound up, drawn in water at 55–60 C. at a ratio of 4.7/1, twisted, doubled and coned by conventional methods. The ten strand yarn so obtained was highly lustrous. When tested in the Cambridge fibre extensometer at 70° F. and 65% RH its tenacity was 3.2 grams per denier and its extension at break was 16.5%.

What is claimed is:

1. A series of highly polymeric linear terephthalic esters composed of recurring structural units of the formula

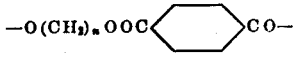

wherein $n$ represents an integer within the range of 2 to 10, the three lowest members of the series having melting points above 200° C.; said esters, when formed into filaments, having the characteristic property of being capable of being cold-drawn to the extent of several hundred per cent of the original length to form fibres of great strength and pliability.

2. A highly polymeric linear terephthalic ester composed of recurring structural units of the formula

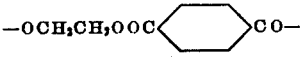

said ester having the characteristic property, when formed into filaments, of being capable of being cold-drawn to the extent of several hundred per cent of the original length to form fibres of great strength and pliability, said ester having a melting point above 200° C.

3. A highly polymeric linear terephthalic ester composed of recurring structural units of the formula

said ester having the characteristic property, when formed into filaments, of being capable of being cold-drawn to the extent of several hundred per cent of the original length to form fibres of great strength and pliability, said ester having a melting point above 200° C.

4. A highly polymeric linear terephthalic ester composed of recurring structural units of the formula

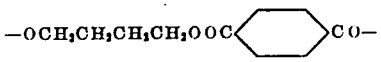

said ester having the characteristic property, when formed into filaments, of being capable of being cold drawn to the extent of several hundred per cent of the original length to form fibres of great strength and pliability, said ester having a melting point above 200° C.

5. A series of highly polymeric linear polymethylene terephthalates having from 2 to 10 carbon atoms in their polymethylene groups, in the form of cold-drawn fibres of great strength and pliability, showing by characteristic X-ray patterns molecular orientation along the fibre axis; the three lowest members of said series having melting points above 200° C.

6. A highly polymeric linear ethylene terephthalate in the form of cold-drawn fibres of great strength and pliability and showing by characteristic X-ray patterns molecular orientation along the fibre axis, said terephthalate having a melting point above 200° C.

7. A highly polymeric linear trimethylene terephthalate in the form of cold-drawn fibres of great strength and pliability and showing by characteristic X-ray patterns molecular orientation along the fibre axis, said terephthalate having a melting point above 200° C.

8. A highly polymeric linear tetramethylene terephthalate in the form of cold-drawn fibres of great strength and pliability and showing by characteristic X-ray patterns molecular orientation along the fibre axis, said terephthalate having a melting point above 200° C.

9. In the manufacture of highly polymeric materials which are capable of being formed into filaments having cold drawing properties, the process which comprises heating polymerizable polymethylene terephthalate having from 2 to 10 carbon atoms in its polymethylene group at temperatures above its melting point to produce a high polymer, removing by distillation the polymethylene glycol which is liberated, and continuing the heating until a stage is reached where filaments formed from the melt possess the property of cold drawing.

10. The process of claim 9 followed by the steps of forming the product into filaments and cold drawings said filaments.

11. The process of claim 9 wherein the heating step is conducted in the presence of a polymerizing catalyst.

12. In the manufacture of highly polymeric materials which are capable of being formed into filaments having cold drawing properties, the process which comprises heating and reacting an alkyl ester of terephthalic acid having 1–7 carbon atoms in the alkyl group with an excess of a polymethylene glycol having from 2 to 10 carbon atoms, under conditions producing ester interchange and the formation of the corresponding glycol terephthalate, then further heating said glycol terephthalate at temperatures above its melting point to produce a high polymer, removing by distillation the polymethylene glycol which is liberated, and continuing the heating until a stage is reached at which filaments formed from the mass possess the property of cold drawing.

13. The process of claim 12 followed by the steps of forming the product into filaments and cold drawing said filaments.

14. In the manufacture of highly polymeric materials which are capable of being formed into filaments having cold drawing properties, the process which comprises heating and reacting an ester of terephthalic acid and an alcohol of the formula R-OH where R is an alkyl group having from 1-7 carbon atoms with an excess of polymethylene glycol having from 2 to 10 carbon atoms, said glycol having a boiling point above the boiling point of said alcohol, in the presence of an ester-interchange catalyst, removing the alcohol formed by the reaction by heating to temperatures above the boiling point of said alcohol, then further heating the resulting glycol terephthalate at temperatures above its melting point to produce a high polymer, removing by distillation the polymethylene glycol which is liberated, and continuing the heating until a stage is reached at which filaments formed from the mass possess the property of cold drawing.

15. The process of claim 14 wherein said ester-interchange catalyst comprises an alkali metal.

16. The process of claim 14 wherein said ester-interchange catalyst comprises an alkali metal together with another metal.

JOHN REX WHINFIELD.
JAMES TENNANT DICKSON.

REFERENCES CITED

The following references are of record in the file of this patent:

UNITED STATES PATENTS

| Number | Name | Date |
|---|---|---|
| 2,071,250 | Carothers | Feb. 16, 1937 |
| 2,249,950 | Fuller | July 22, 1941 |
| 2,282,827 | Rothrock | May 12, 1942 |
| 2,312,879 | Christ | Mar. 2, 1943 |
| 2,437,046 | Rothrock et al. | Mar. 2, 1948 |

FOREIGN PATENTS

| Number | Country | Date |
|---|---|---|
| 414,665 | Great Britain | Aug. 7, 1934 |

OTHER REFERENCES

Carothers: Collected Papers (1940), pages 26–27, 156–164.